US011877134B2

(12) United States Patent
Fu et al.

(10) Patent No.: US 11,877,134 B2
(45) Date of Patent: Jan. 16, 2024

(54) MICROPHONE

(71) Applicant: APUTURE IMAGING INDUSTRIES CO., LTD., Guangdong (CN)

(72) Inventors: Ziping Fu, Guangdong (CN); Xiangjun Zhou, Guangdong (CN); Yi Xie, Guangdong (CN)

(73) Assignee: APUTURE IMAGING INDUSTRIES CO., LTD., Guangdong (CN)

( * ) Notice: Subject to any disclaimer, the term of this patent is extended or adjusted under 35 U.S.C. 154(b) by 142 days.

(21) Appl. No.: 17/551,684

(22) Filed: Dec. 15, 2021

(65) Prior Publication Data

US 2022/0109935 A1 Apr. 7, 2022

Related U.S. Application Data

(63) Continuation of application No. 16/816,198, filed on Mar. 11, 2020, now Pat. No. 11,317,210.

(30) Foreign Application Priority Data

Jan. 2, 2020 (CN) ........................ 202020003381.X

(51) Int. Cl.
*H04R 5/04* (2006.01)
*H04R 3/00* (2006.01)

(52) U.S. Cl.
CPC ............... *H04R 5/04* (2013.01); *H04R 3/005* (2013.01); *H04R 2420/00* (2013.01)

(58) Field of Classification Search
CPC ....... H04R 5/04; H04R 3/005; H04R 2420/00
USPC ........................................................... 381/77
See application file for complete search history.

(56) References Cited

U.S. PATENT DOCUMENTS

2019/0028803 A1* 1/2019 Benattar .............. H04R 5/0335

* cited by examiner

*Primary Examiner* — Paul Kim
(74) *Attorney, Agent, or Firm* — Robert L. Stearns; Dickinson Wright PLLC

(57) ABSTRACT

A microphone is provided, which includes: a housing; at least one sound-pickup member disposed on the housing and configured to collect an external sound source; and a control circuit board disposed in the housing and in electrical connection to the at least one sound-pickup member; wherein the control circuit board comprises at least one input jack, and the at least one input jack is configured to operably connect with an external plug to collect other sound source different with the external sound source. In a detailed application, when the at least one sound-pickup member comprises at least two sound-pickup members, the control circuit board is configured, once a selection module of the control circuit board is triggered, to selectively output external sound sources collected by one or more of the at least two sound-pickup members and/or the other sound source collected by the at least one input jack.

12 Claims, 4 Drawing Sheets

MICROPHONE

CROSS-REFERENCE TO RELATED APPLICATIONS

This application is a U.S. Continuation Patent Application of U.S. patent application Ser. No. 16/816,198 of Ziping F U et al, entitled "MICROPHONE", filed on Mar. 11, 2020, which claims priority to Chinese Patent Application No. 202020003381.X, filed on Jan. 2, 2020, the entire contents of all of which are incorporated herein by reference.

TECHNICAL FIELD

The present application relates to the field of audio technology, and in particular, to a microphone.

BACKGROUND

Most of the existing microphones are single-ended microphones. When recording, it is necessary to adjust the sound-pickup end of the microphone to point at the object to be recorded. When recording, it is necessary to change the direction of the microphone according to the needs of the scene to achieve the best recording effect. When applications such as narration or background audio recording are needed, it shows weakness or inability, as it is necessary to constantly adjust the direction of the microphone, or to synthesize by software after recording through other recording equipment.

SUMMARY

The present application is to solve the above problems in the prior art, and a microphone is proposed.

In order to solve the above technical problems, the present application provides a microphone, including:

a housing;

at least one sound-pickup member disposed on the housing and configured to collect an external sound source; and a control circuit board disposed in the housing and in electrical connection to the at least one sound-pickup member;

wherein the control circuit board comprises at least one input jack, and the at least one input jack is configured to operably connect with an external plug to collect other sound source different with the external sound source.

In an embodiment, the other sound source is a sound source generated by a microphone, a smartphone, a player, a radio, a walkie-talkie.

In an embodiment, the at least one sound-pickup member comprises at least two sound-pickup members configured to collect external sound sources from different directions, and the control circuit board is configured to be in electrical connection to the at least two sound-pickup members;

wherein the control circuit board further comprises an output jack and a selection module, one end of the selection module is electrically connected to the output jack, and another end of the selection module is electrically connected to the at least one input jack and the at least two sound-pickup members;

wherein the control circuit board is configured, once the selection module of the control circuit board is triggered, to selectively output the external sound sources collected by one or more of the at least two sound-pickup members and/or the other sound source collected by the at least one input jack through the output jack.

In an embodiment, the control circuit board is configured, once the selection module of the control circuit board is triggered, to selectively output one of following through the output jack:

the external sound sources collected by one or more of the at least two sound-pickup members when the at least one input jack is not connected with the external plug; and the external sound source collected by one of the at least two sound-pickup members and the other sound source collected by the at least one input jack when the at least one input jack is connected with the external plug.

In an embodiment, the number of the at least two sound-pickup members is two, and the two sound-pickup members are respectively disposed at two ends of the housing to form a front sound-pickup member and a rear sound-pickup member that are arranged oppositely to collect the external sound sources from different directions.

In an embodiment, the front sound-pickup member and the rear sound-pickup member are threadedly engaged with the housing, respectively.

In an embodiment, the number of the at least one input jack is one; the selection module is a selection circuit of 1×2 channels with three contacts, a first contact of the selection circuit is electrically connected to the output jack, a second contact of the selection circuit is electrically connected to the front sound-pickup member, and a third contact of the selection circuit is electrically connected to the rear sound-pickup member or the input jack; and here the input jack is provided with a built-in switch, the third contact of the selection circuit is electrically connected to the rear sound-pickup member via the built-in switch when the input jack is not inserted by the external plug, and the third contact of the selection circuit is disconnected from the rear sound-pickup member and electrically connected to the external plug via the built-in switch when the input jack is inserted by the external plug.

In an embodiment, the built-in switch of the input jack is a spring leaf.

In an embodiment, the housing is cylindrical, the housing defines a first inserting hole and a second inserting hole spaced from each other, and the input jack and the output jack are respectively embedded in the first inserting hole and the second inserting hole.

In an embodiment, the front sound-pickup member has two input pins, the rear sound-pickup member has two input pins, the output jack has four output pins, and the input jack has five input pins; here a first pin of the rear sound-pickup member is connected to a fifth pin of the input jack, and a second pin of the rear sound-pickup member is connected to a first pin of the output jack; a first pin of the front sound-pickup member is connected to a third pin of the output jack and the second contact of the selection circuit, and a second pin of the front sound-pickup member is connected to a fourth pin of the output jack, and a first and a fourth pins of the input jack; the first contact of the selection circuit is connected to a second pin of the output jack, and a second and the fifth pins of the input jack are connected via the built-in switch; and the first and fourth pins of the output jack, the first and fourth pins of the input jack, and the second pin of the front sound-pickup member, and the second pin of the rear sound-pickup member are grounded.

In an embodiment, a first capacitor is connected between the first pin of the front sound-pickup member and the second contact of the selection circuit, a second capacitor is connected between the first pin and the second pin of the rear sound-pickup member, and a third capacitor is connected between the first pin and the second pin of the front sound-pickup member.

In an embodiment, the microphone further comprises a switch member configured to trigger the selection module of the control circuit board.

In an embodiment, the switch member is a mechanical switch or an electronic switch, and the mechanical switch or the electronic switch is configured for triggering a connection of the contacts of the selection circuit.

In an embodiment, an opening is defined in a surface of the housing, and the switch member is at least partially exposed from the opening.

Compared with the prior art, the present application addresses the shortcoming that it is necessary to change the direction of the microphone according to the needs of the scene. By setting at least two sound-pickup members on the housing, and triggering the control circuit board by operating the switch member, any sound-pickup member can be selected for collecting a sound source, thereby realizing the flexible selection and configuration of multiple sound-pickup members, and enriching the use scenario of the operator. Once the recording site is set up, recordings with different requirements can be realized by switching circuit, so as to reduce the mechanical movement of recording equipment, which is suitable for recording equipment such as a camera and a camcorder. It provides a more flexible and simple operation for photography professionals and enthusiasts who are engaged in professional film, VIDEO, TV, narration, Vlogger and other fields.

DETAILED DESCRIPTION

In order to make the objectives, technical solutions, and advantages of the present application clearer, the present application is further described in detail below with reference to the accompanying drawings and embodiments. It should be understood that the specific embodiments described herein are only used to explain the present application, and are not intended to limit the present application.

Figure 1:
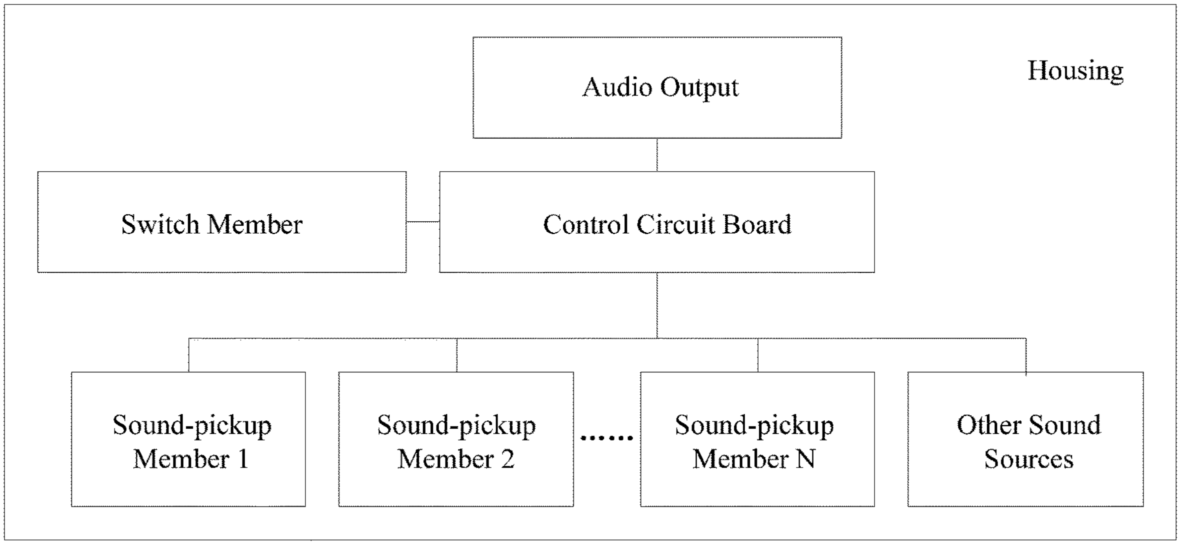
FIG. 1 is a schematic block diagram of an embodiment of a microphone of the present application.

Referring to the schematic block diagram in FIG. 1, the present application provides a microphone, including: a housing, at least two sound-pickup members, a control circuit board, and a switch member.

The housing can be made of plastic or metal. The at least two sound-pickup members are respectively disposed on the housing, for example, the sound-pickup members may be fixed on the housing by means of snap-fitting or bonding. The number of sound-pickup members can be two, three, or four. The sound-pickup member may be a microphone head, for example, a monaural microphone head, etc. Of course, a dual-channel or a stereo microphone head may also be used.

The sound-pickup member is configured for collecting external sound sources, such as the required sound in professional movies, VIDEO, TV, narration and Vlogger. It can be understood that the at least two sound-pickup members can respectively collect audio in different directions, thereby realizing omnidirectional sound collection.

The control circuit board is disposed in the housing and is electrically connected to the at least two sound-pickup members respectively; the control circuit board may include a PCB (Printed Circuit Board) and the like. The electrical connection of the sound-pickup member may be realized by metal wires, PCB printed wire, or the like. The switch member is configured to trigger the control circuit board to select one or more of the sound-pickup members for collecting external sound sources. The switch member may be an electronic or physical switch, and of course, it may also be an electronic device, such as a mobile phone, a tablet, a smart watch, or the like, that can send a signal to control switching. The control circuit board is configured to control the outputs of the sound sources of the at least two sound-pickup members. For example, when the switch member is operated, one of the sound-pickup members can be controlled by the control circuit board to output audio, while the other sound-pickup members do not output sound; or a triggering signal is sent to the control circuit board by the switch member, such that the control circuit board sends an electrical signal, so as to enable at least two sound-pickup members output sound at the same time.

The present application integrates a plurality of sound-pickup microphones in one housing (different microphones point in different directions), and the housing can be installed on a device such as a camera. The switch member triggers the at least two sound-pickup members that are electrically connected to the control circuit board, thus a flexible collection of the sound sources of the scene can be realized, such that tedious operations such as mechanically rotating the direction and position of the sound-pickup members are avoided, thereby improving the operation efficiency of the sound-pickup process in scenes such as film or video shooting.

Figure 2:
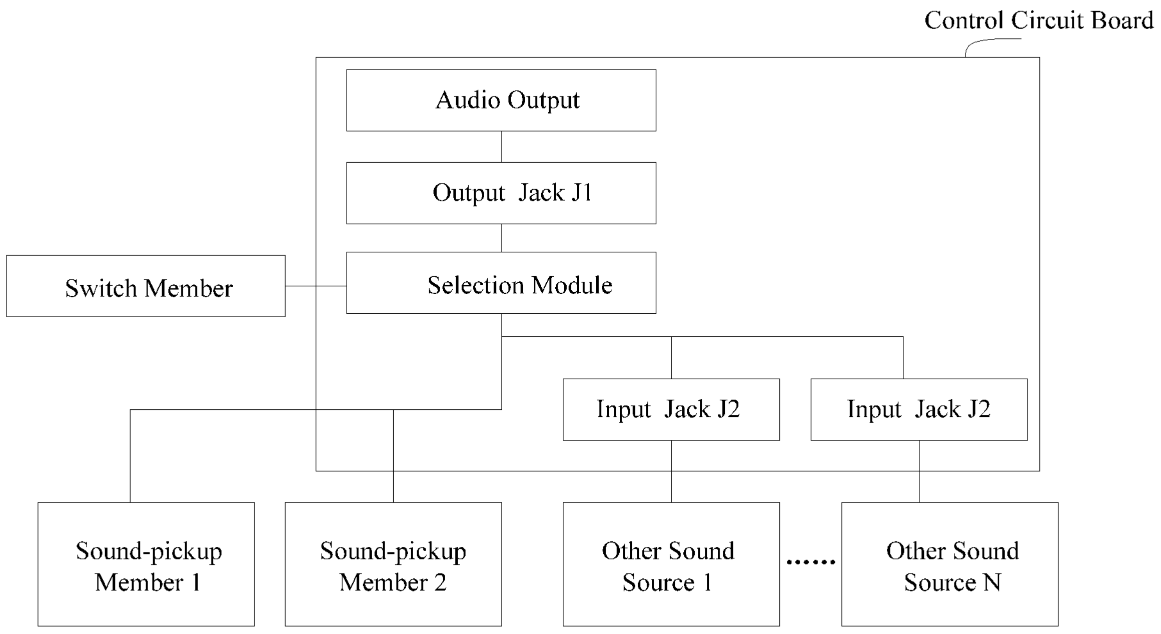
FIG. 2 is a schematic block diagram of another embodiment of a microphone of the present application.

In some embodiments, referring to FIG. 2, the control circuit board includes an output jack J1, at least one input jack J2, and a selection module. The input jack J2 is configured to be connected to an external plug to obtain other sound sources. The other sound sources may be sound sources generated by other microphones, smartphones, players, radios, walkie-talkies, and the like. The input jack J2 can be a CTIA (Cellular Telecommunications Industry Association) or OMTP (Open Mobile Terminal Platform) type adaptive socket, and sound sources of an external device can be input by inserting a corresponding plug. The selection module may be a selection circuit of 1×N channels. One end of the selection module is electrically connected to the output jack J1, and the other end of the selection module is electrically connected to the at least one input jack J2 and the at least two sound-pickup members. The switch member is configured to trigger the selection module to select and output the sound sources collected by the at least two sound-pickup members and/or the at least one input jack J2 through the output jack J1. The selection module is triggered by the switch member, such that multiple sound sources collected are output through the output jack J1. It can be understood that the microphone can not only collect sound sources through its own sound-pickup members, but also connect sound sources generated by other equipment, so as to realize the collection of multiple sound sources, thereby improving the applicability of the microphone.

Figure 4:
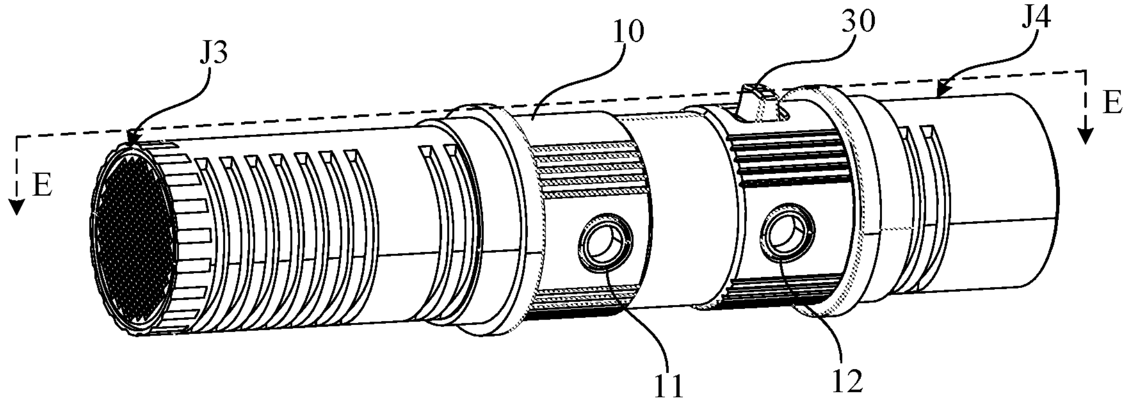
FIG. 4 is a schematic view showing the structure of a microphone according to an embodiment of the present application.
Figure 5:
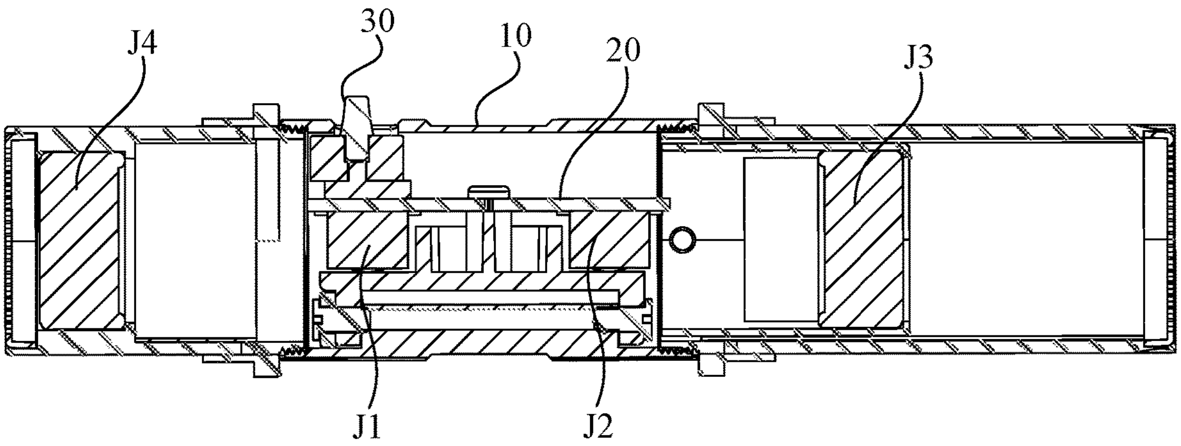
FIG. 5 is a schematic view showing the cross-sectional structure with E-E as section line in FIG. 4.

In some embodiments, referring to FIG. 4 and FIG. 5, the number of sound-pickup members are two, and the two sound-pickup members are respectively located at two ends of the housing 10 to form a front sound-pickup member J3 and a opposite rear sound-pickup member J4, and the switch member 30 is disposed on the housing 10 and is located between the front sound-pickup member J3 and the rear sound-pickup member (J4).

Optionally, referring to FIG. 4 and FIG. 5, the housing 10 is cylindrical. Of course, the housing 10 may also have other shapes, which is not limited herein. The outer surface of the housing 10 can also be provided with antiskid threads in the circumferential direction to facilitate user operation. The housing 10 defines a first inserting hole 11 and a second inserting hole 12 spaced apart from each other. The first inserting hole 11 and the second inserting hole 12 are circular and are configured to fit a CTIA or OMTP type plug. The input jack J2 and the output jack J1 are respectively embedded in the first inserting hole 11 and the second inserting hole 12. It can be understood that the input jack J2 and the output jack J1 are electrically connected to the control circuit board 20, for example, they can be welded on the control circuit board 20. The pins of the input jack J2 and the output jack J1 are just in electrical connection to the contacts of the selection circuit S1 on the control circuit board 20.

Figure 3:
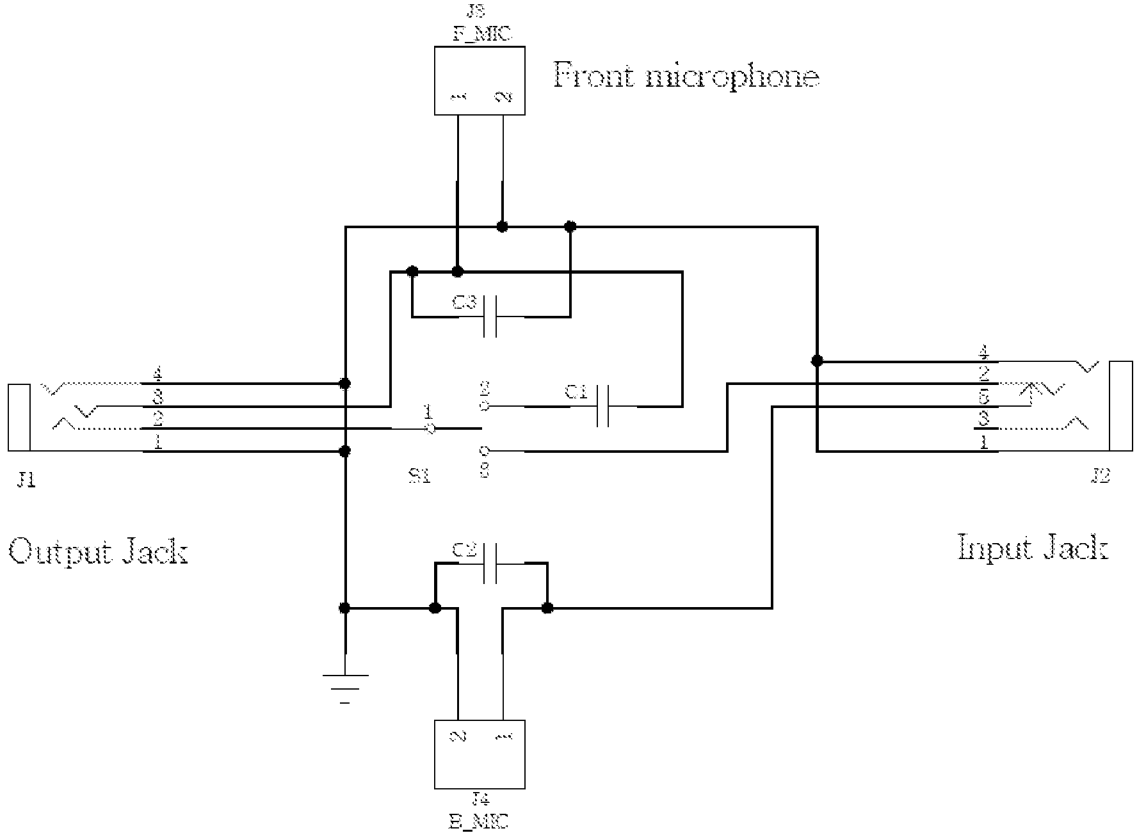
FIG. 3 is a schematic diagram showing the circuit structure of an embodiment of a microphone of the present application.

Further, referring to FIG. 3, the number of input jack J2 is one, and the selection module is a selection circuit of 1×2 channels with three contacts. A first contact 1 of the selection circuit is electrically connected to the output jack J1, a second contact 2 of the selection circuit is electrically connected to the front sound-pickup member J3, and a third contact 3 of the selection circuit is electrically connected to the rear sound-pickup member J4 or the input jack J2. The input jack J2 is provided with a built-in switch. When the input jack J2 is not inserted by an external plug, the third contact of the selection circuit is electrically connected to the rear sound-pickup member J4 through the built-in switch; when the input jack J2 is inserted by an external plug, the third contact of the selection circuit is disconnected from the rear sound-pickup member J4 through the built-in switch and is electrically connected to the external plug.

The front sound-pickup member J3 has two input pins, the rear sound-pickup member J4 has two input pins, the output jack J1 has four output pins, and the input jack J2 has 5 input pins. A first pin of the rear sound-pickup member J4 is connected to a fifth pin of the input jack J2, and a second pin of the rear sound-pickup member J4 is connected to a first pin of the output jack J1. A first pin of the front sound-pickup member J3 is connected to a third pin of the output jack J1 and the second contact 2 of the selection circuit, and a second pin of the front sound-pickup member J3 is connected to a fourth pin of the output jack J1, and a first and a fourth pins of the input jack J2. The first contact 1 of the selection circuit is connected to a second pin of the output jack J1, and a second and the fifth pins of the input jack J2 are connected via the built-in switch. The built-in switch can be a spring leaf, or the like. The first and fourth pins of the output jack J1, the first and fourth pins of the input jack J2, the second pin of the front sound-pickup member J3, and the second pin of the rear sound-pickup member J4 are grounded.

It can be understood that under normal circumstances (when no external plug is inserted), the second and fifth pins of the input jack J2 are always shorted. When the switch member is operated such that the first contact 1 and the second contact 2 of the selection circuit are linked to each other, the front sound-pickup member J3 directly communicates with the output jack J1, and at this time, only the front sound-pickup member J3 works normally to realize the collection of sound sources. When the switch member is operated such that the first contact 1 and the second contact 3 of the selection circuit are linked to each other, both the front sound-pickup member J3 and the rear sound-pickup member J4 communicate with the output jack J1, and at this time, the front sound-pickup member J3 and the rear sound-pickup member J4 work together for collecting front and rear audio. When an external plug is inserted into the input jack J2, the second and fifth pins of the input jack J2 are disconnected (no longer shorted), and the fifth and third pins of the input jack J2 are shorted, such that other external sound sources and the front sound-pickup member J3 work together to realize the collection of audios.

In some embodiments, a first capacitor C1 is connected between the first pin of the front sound-pickup member J3 and the second contact 2 of the selection circuit, and the first capacitor C1 is a coupling capacitor. A second capacitor C2 is connected between the first and second pins of the rear sound-pickup member J4, and a third capacitor C3 is connected between the first and second pins of the front sound-pickup member J3. The second capacitor C2 and the third capacitor C3 are anti-interference suppression capacitors. The sizes of the first capacitor C1, the second capacitor C2, and the third capacitor C3 may all be 10 uF.

In some embodiments, the switch member 30 is a mechanical switch or an electronic switch, and the mechanical switch or the electronic switch is configured to trigger a connection of the contacts of the selection circuit. An opening is defined in the surface of the housing 10, and the switch member 30 is at least partially exposed from the opening. When the switch member 30 is a mechanical switch, the switch member 30 can slide relative to the opening, so as to trigger the selection module S1 in the control circuit board 20. In this way, it is possible to make it easier for the user to operate the switch member 30.

Optionally, the front sound-pickup member J3 and the rear sound-pickup member J4 are threadedly engaged with the housing 10, respectively. That is, both ends of the inner wall of the housing 10 have internal threads, and the outer walls of the front sound-pickup member J3 and the rear sound-pickup member J4 have external threads. In this way, replacement of the sound-pickup members can be realized, and it is convenient for subsequent maintenance. Of course, in order to achieve better sound-pickup, the front sound-pickup member J3 and the rear sound-pickup member J4 can also be provided with through holes in their outer walls axially, and the front sound-pickup member J3 and the rear sound-pickup member J4 can also be provided with protective nets in their end faces, so as to prevent foreign objects from entering the interior of the sound-pickup members.

The above are only implementations of the present application, and do not limit the protection scope of the present application. Any equivalent structure or equivalent process substituent made by using the specification and drawings of the present application, directly or indirectly applied in other related technical fields, shall likewise be included in the protection scope of the present application.

What is claimed is:

1. A microphone, comprising:

a housing;

at least one sound-pickup member disposed on the housing and configured to collect an external sound source; and a control circuit board disposed in the housing and in electrical connection to the at least one sound-pickup member;

wherein the control circuit board comprises at least one input jack, and the at least one input jack is configured to operably connect with an external plug to collect other sound source different with the external sound source;

wherein the at least one sound-pickup member comprises at least two sound-pickup members configured to collect external sound sources from different directions, and the control circuit board is configured to be in electrical connection to the at least two sound-pickup members;

wherein the control circuit board further comprises an output lack and a selection module that is able to be triggered, one end of the selection module is electrically connected to the output jack, and another end of the selection module is electrically connected to the at least one input jack and the at least two sound-pick-up members;

wherein the control circuit board is configured once the selection module of the control circuit board is triggered to selectively out art the external sound sources collected by one or more of the at least two soured-pickup members and/or the other sound source collected by the at least one input jack through the output jack;

wherein the number of the at least two sound-pickup members is two, and the two sound-pickup members are respectively disposed at two ends of the housing to form a front sound-pickup member and a rear sound-pickup member that are arranged oppositely to collect the external sound sources from different directions.

2. The microphone according to claim 1, wherein the other sound source is a sound source generated by a microphone, a smartphone, a player, a radio, or a walkie-talkie.

3. The microphone according to claim 1, wherein the control circuit board is configured, once the selection module of the control circuit board is triggered, to selectively output one of following through the output jack:

the external sound sources collected by one or more of the at least two sound-pickup members when the at least one input jack is not connected with the external plug; and the external sound source collected by one of the at least two sound-pickup members and the other sound source collected by the at least one input jack when the at least one input jack is connected with the external plug.

4. The microphone according to claim 1, wherein the front sound-pickup member and the rear sound-pickup member are threadedly engaged with the housing, respectively.

5. The microphone according to claim 1, wherein the number of the at least one input jack is one; the selection module is a selection circuit of 1×2 channels with three contacts, a first contact of the selection circuit is electrically connected to the output jack, a second contact of the selection circuit is electrically connected to the front sound-pickup member, and a third contact of the selection circuit is electrically connected to the rear sound-pickup member or the input jack; and wherein the input jack is provided with a built-in switch, the third contact of the selection circuit is electrically connected to the rear sound-pickup member via the built-in switch when the input jack is not inserted by the external plug, and the third contact of the selection circuit is disconnected from the rear sound-pickup member and electrically connected to the external plug via the built-in switch when the input jack is inserted by the external plug.

6. The microphone according to claim 5, wherein the built-in switch of the input jack is a spring leaf.

7. The microphone according to claim 5, wherein the housing is cylindrical, the housing defines a first inserting hole and a second inserting hole spaced from each other, and the input jack and the output jack are respectively embedded in the first inserting hole and the second inserting hole.

8. The microphone according to claim 5, wherein the front sound-pickup member has two input pins, the rear sound-pickup member has two input pins, the output jack has four output pins, and the input jack has five input pins; wherein a first pin of the rear sound-pickup member is connected to a fifth pin of the input jack, and a second pin of the rear sound-pickup member is connected to a first pin of the output jack; a first pin of the front sound-pickup member is connected to a third pin of the output jack and the second contact of the selection circuit, and a second pin of the front sound-pickup member is connected to a fourth pin of the output jack, and a first and a fourth pins of the input jack; the first contact of the selection circuit is connected to a second pin of the output jack, and a second and the fifth pins of the input jack are connected via the built-in switch; and the first and fourth pins of the output jack, the first and fourth pins of the input jack, and the second pin of the front sound-pickup member, and the second pin of the rear sound-pickup member are grounded.

9. The microphone according to claim 8, wherein a first capacitor is connected between the first pin of the front sound-pickup member and the second contact of the selection circuit, a second capacitor is connected between the first pin and the second pin of the rear sound-pickup member, and a third capacitor is connected between the first pin and the second pin of the front sound-pickup member.

10. The microphone according to claim 1, wherein the microphone further comprises a switch member configured to trigger the selection module of the control circuit board.

11. The microphone according to claim 10, wherein the switch member is a mechanical switch or an electronic switch, and the mechanical switch or the electronic switch is configured for triggering a connection of the contacts of the selection circuit.

12. The microphone according to claim 10, wherein an opening is defined in a surface of the housing, and the switch member is at least partially exposed from the opening.

* * * * *